United States Patent
Barzilay et al.

(10) Patent No.: US 10,593,054 B2
(45) Date of Patent: Mar. 17, 2020

(54) ESTIMATION OF 3D POINT CANDIDATES FROM A LOCATION IN A SINGLE IMAGE

(71) Applicant: Intel Corporation, Santa Clara, CA (US)

(72) Inventors: Ouriel Barzilay, Jerusalem (IL); Jonathan Abramson, Aminadav (IL)

(73) Assignee: Intel Corporation, Santa Clara, CA (US)

(*) Notice: Subject to any disclaimer, the term of this patent is extended or adjusted under 35 U.S.C. 154(b) by 708 days.

(21) Appl. No.: 15/199,045

(22) Filed: Jun. 30, 2016

(65) Prior Publication Data
US 2018/0005399 A1    Jan. 4, 2018

(51) Int. Cl.
*G06T 7/536* (2017.01)
*G06T 7/557* (2017.01)
*G06T 7/143* (2017.01)
*G06T 7/521* (2017.01)

(52) U.S. Cl.
CPC .............. *G06T 7/536* (2017.01); *G06T 7/143* (2017.01); *G06T 7/521* (2017.01); *G06T 7/557* (2017.01); *G06T 2207/10024* (2013.01); *G06T 2207/10028* (2013.01)

(58) Field of Classification Search
CPC ......... G06T 7/143; G06T 7/421; G06T 7/536; G06T 7/557; G06T 2207/10024; G06T 2207/10028
See application file for complete search history.

(56) References Cited

PUBLICATIONS

Whelan et al. "Deformation-based loop closure for large scale dense RGB-D Slam." 2013 IEEE/RSJ International Conference on Intelligent Robots and Systems. IEEE, 2013. (Year: 2013).*
Whelan et al. "Robust real-time visual odometry for dense RGB-D mapping." (2013) (Year: 2013).*
Richtsfeld et al. "Towards scene understanding object segmentation using rgbd-images." Computer Vision Winter Workshop (CVWW). vol. 2. 2012. (Year: 2012).*
Föcker et al. "Real-time cargo volume recognition using internet-connected 3D scanners." 2015 International Conference on Evaluation of Novel Approaches to Software Engineering (ENASE). IEEE, Apr. 2015. (Year: 2015).*

* cited by examiner

*Primary Examiner* — Katrina R Fujita
(74) *Attorney, Agent, or Firm* — International IP Law Group, P.L.L.C.

(57) ABSTRACT

An apparatus for an electronic measurement using a single image is described herein. The apparatus includes a surface fitting mechanism that is to estimate the analytical model of a surface on which lies the point of the single image and a ray casting unit that is to cast a virtual ray at the selected point that intersects the surface. The apparatus also includes a computing unit to compute a least one three-dimensional location for the selected point based on the intersection of the virtual ray and the plane.

23 Claims, 11 Drawing Sheets

100C

400A

ESTIMATION OF 3D POINT CANDIDATES FROM A LOCATION IN A SINGLE IMAGE

BACKGROUND ART

Real world measurement using electronic devices is a unique aspect of the computer vision field. The ability to provide measurements between points of an image may have endless applications, including use by industrial and private users. The measurements can be inaccurate when existing sensors and hardware used to capture data to calculate the measurements are subjected to noise and missing data in captured images.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1A:
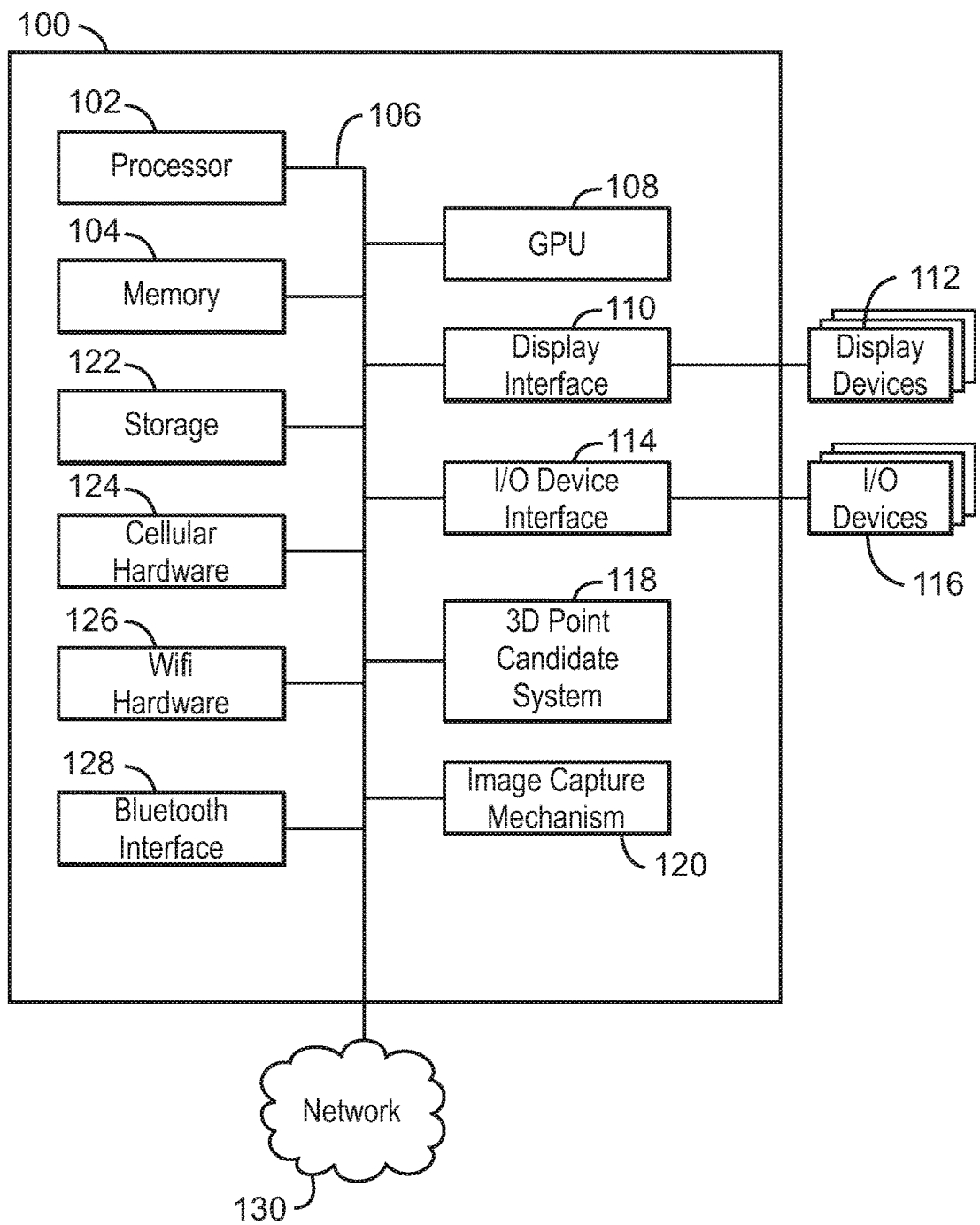
FIG. 1A is a block diagram of an electronic device that enables an estimation of 3D point candidates from a single image.

As discussed above, computer vision can encompass the ability to measure real world distances in an image. In some cases, point-to-point measurements are calculated using several depth frames to scan and reconstruct a three-dimensional (3D) model of the scene. Additionally, in some cases, a dense depth map may be provided using frames previously captured or by performing hole-filling by using a color image. A hole in an image is an area in which depth, geometry, or texture data is missing or undefined for at least one pixel. Hole-filling refers to a technique where values are calculated for missing or undefined pixels. Hole-filling may produce unrealistic artifacts which yields inaccurate results in measurements. Moreover, techniques for measuring depth can sometimes use depth values of specific pixels that were selected often inaccurately by a user with his mouse or finger.

Embodiments described herein relate generally to the estimation of three dimensional (3D) point candidates from a single image. In embodiments, the 3D point candidates can be used to find real world measurements, such as distance, length, area, and volume, among others. An apparatus may include an image capture mechanism that is to capture both color information and depth information in the single image for a scene and a plane fitting mechanism that is to calculate a plurality of planes for each pixel of the single image. The apparatus also includes a ray casting unit that is to cast rays into the single image at a plurality of selected points and a computing unit to compute a real-world measurement between the plurality of selected points. While the term single image is used to describe the image used to generate 3D point candidates, the present techniques may be applied to an image that is the output of any image processing unit, such as a combination of several images captured over time.

In embodiments, a point or a plurality of points may be selected in an image containing both depth and color information (RGB-D). The precise location of the point or plurality of points is determined by analyzing the depth information available by each point. In the case of more than one point, the depth information in the region between the plurality of points may also be analyzed to determine an accurate and precise location of each point in a 3D space. Distances can be measured between two points selected by a user from one single image containing both depth and color information (RGB-D). The distance measurement described herein does not require a location within a particular proximity of the item to measure when a picture is available. The present techniques allow measurements of quick events such as measuring leap height. Further, the present techniques enable electronic devices such as smartphones to incorporate an accurate and convenient measuring tool, always at hand.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1A is a block diagram of an electronic device 100 that enables an estimation of 3D point candidates from a single image. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes an RGB-D image to obtain real-world point-to-point measurements.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a 3D point candidate system 118 for estimating the location of one or more points in a 3D space. The 3D point candidate system 118 may use data captured by a low cost image capture mechanism 120 to calculate the location of each point in a 3D space, which can be used to calculate point-to-point measurements between multiple points. In embodiments, the image capture mechanism 120 is any device that captures both color and depth information. Accordingly, in embodiments, the image capture mechanism 120 is an RGB-D camera. The image capture mechanism 120 may also be a time of flight (ToF) camera, ranging camera, flash LIDAR, or any combination thereof.

In embodiments, the image capture mechanism 120 may be used to capture a plurality of images over time, and the plurality of images may be composited into a single image. In some cases, a plurality of images may be layered in order to create a single image. The present techniques can be used to obtain accurate 3D point candidates from a single camera view, without the need for multiple images from multiple camera views.

Figure 1B:
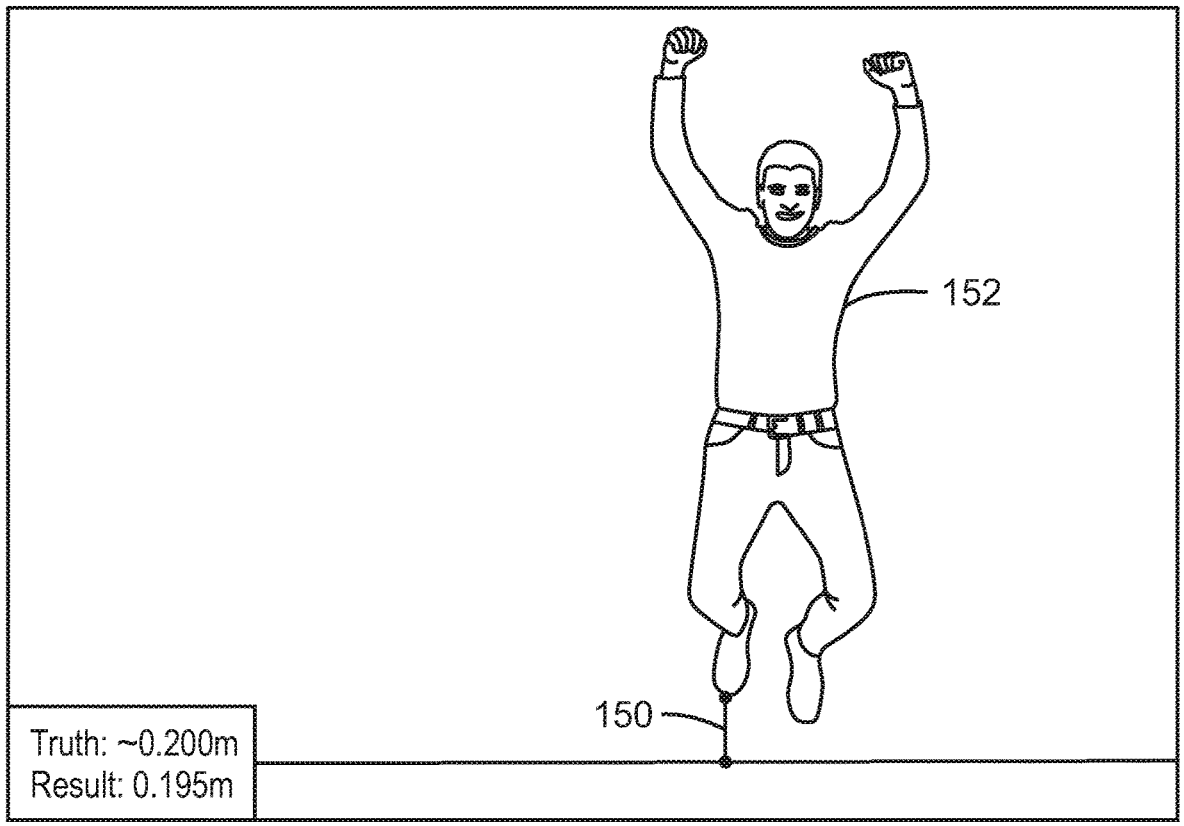
FIG. 1B is a dynamic use case where measurement occurs using digital photography.
Figure 1C:
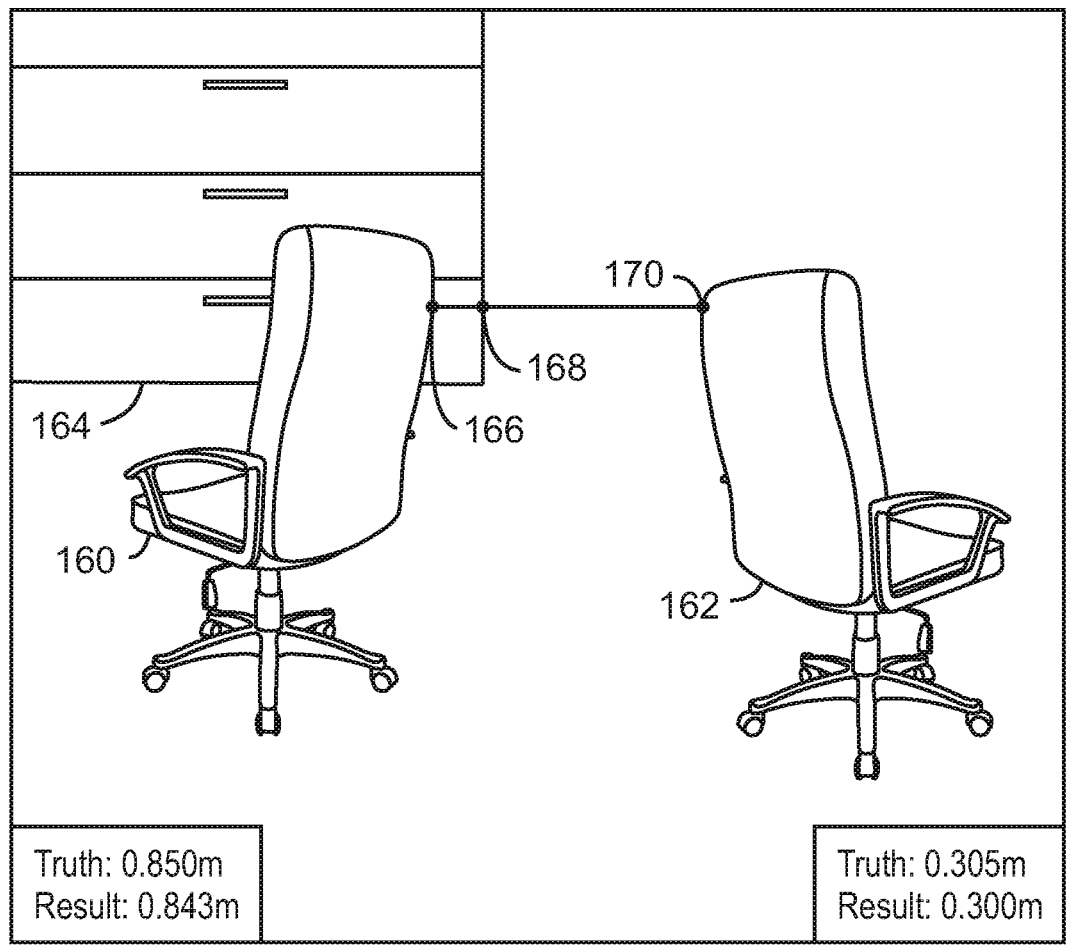
FIG. 1C is a use case including a frame with a possible ambiguity.

The 3D point candidate system 118 may be used in a variety of use cases. For example, in a dynamic use case such as FIG. 1B, the measurement of the height 150 of the jump by person 152 can be found using the frame that occurs at the highest point. FIG. 1O is a use case including a frame 100C with a possible ambiguity. The frame 100C includes a chair 160, a chair 162, and a cabinet 164. Consider the scenario where a user wants to measure the distance along the line 172 connecting points 166, 168, and 170. Depending on how the user selects the point 166 or the point 168, there may be ambiguity in determining if the user is measuring the distance between the chair 160 and the chair 162 in the foreground, or the distance between the edge of the cabinet 164 and the chair 162 in the background. The present techniques can provide both measurements accurately.

Figure 1D:
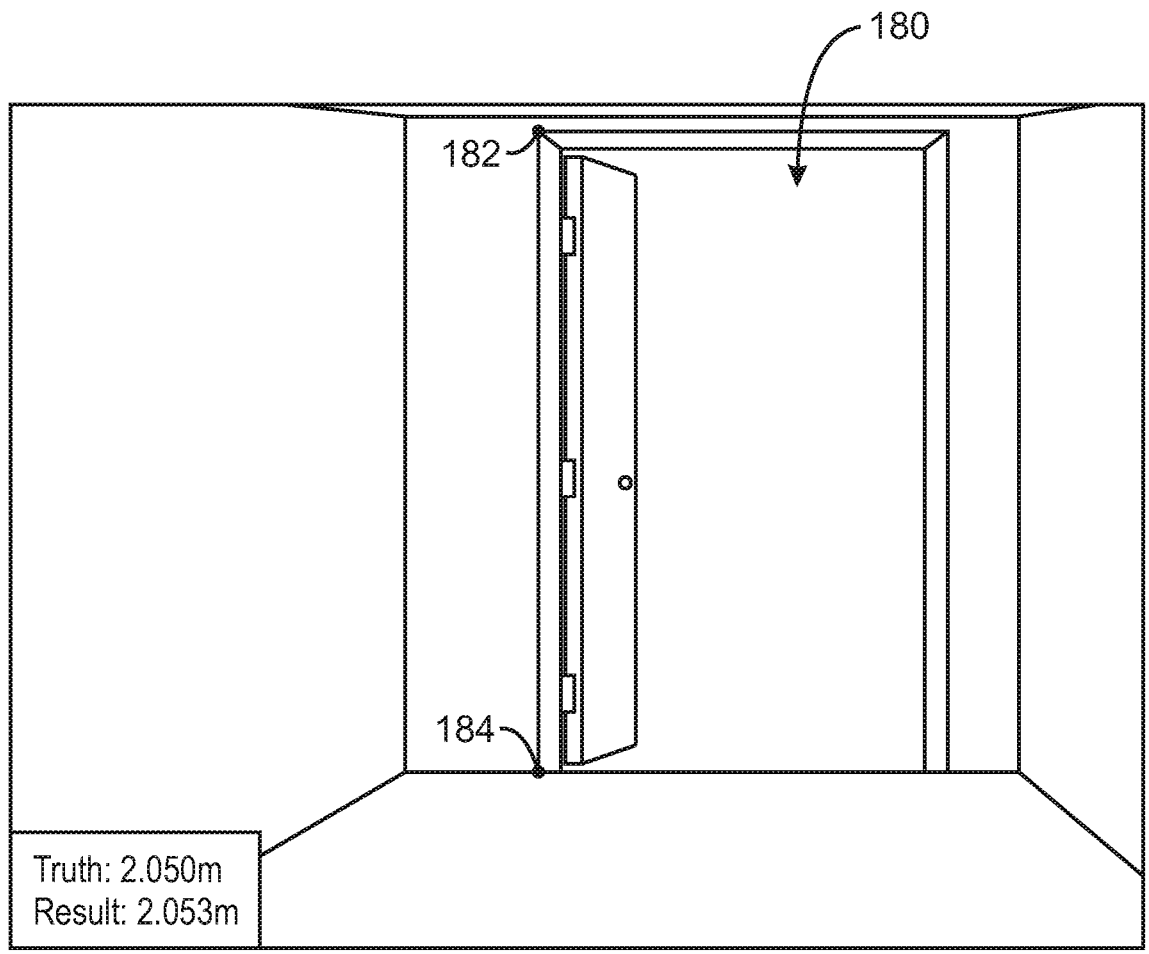
FIG. 1D is an illustration of a frame.
Figure 1E:
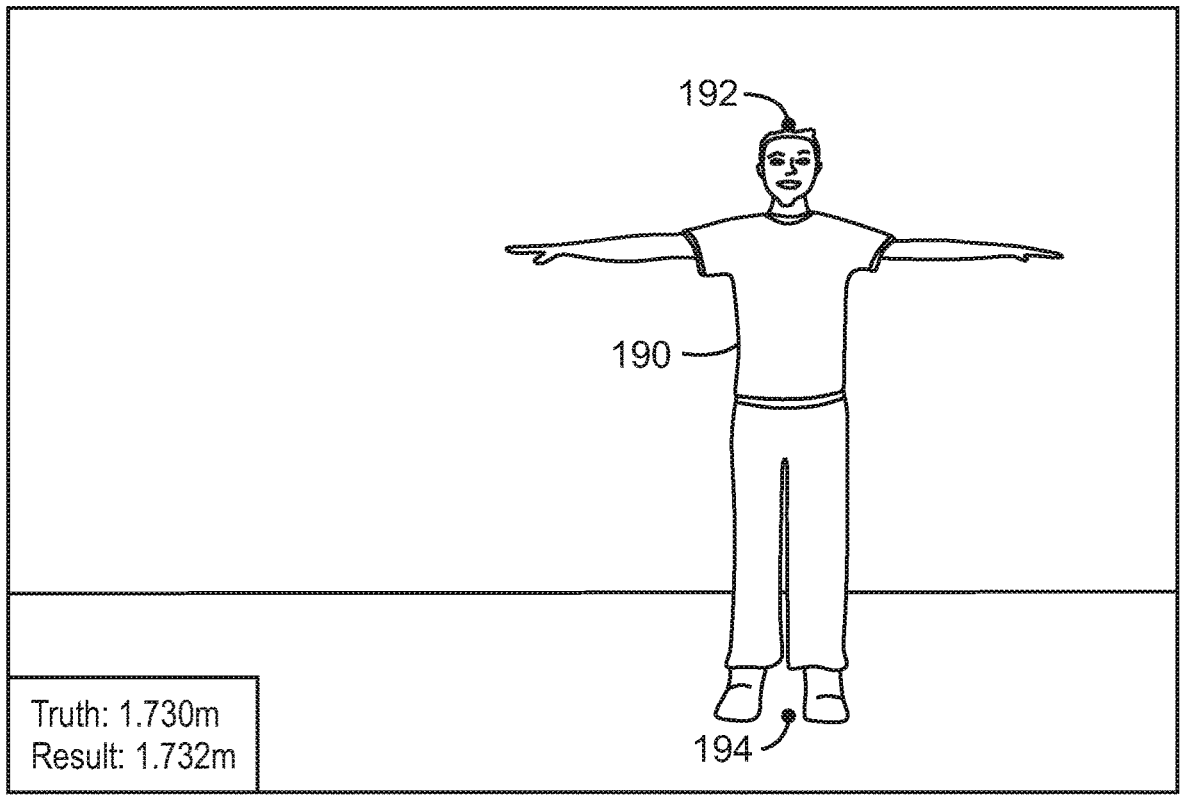
FIG. 1E is an illustration of a frame.

FIG. 1D is an illustration of a frame 100D. The frame 100D includes a doorway 180. The doorway includes a point 182 at the top and a point 184 at the bottom. The present techniques can also be used to measure the distance between the two points resulting in finding the height of the doorway. Similarly, FIG. 1E is an illustration of a frame 100E. The frame 100E includes a person 190. The top pf the person 190 is at point 192 and the bottom of person 190 is at point 194. The present techniques can be used to measure the distance between the two points resulting in finding the height of the person 190. Accordingly, the present techniques address point-to-point measurement using an image captured from a low-cost RGB-D camera. As further described below, the present techniques overcome the phenomena of noise and lack of depth data generally occurring in existing sensors.

Referring again now to FIG. 1A, the electronic device 100 may also include a storage device 122. The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 130 without being tethered or paired to another device, where the network 130 is a cellular network.

The CPU 102 may also be linked through the bus 106 to WiFi hardware 126. The WiFi hardware is hardware according to WiFi standards (standards promulgated as Institute of Electrical and Electronics Engineers' (IEEE) 802.11 standards). The WiFi hardware 126 enables the electronic device 100 to connect to the Internet using the Transmission Control Protocol and the Internet Protocol (TCP/IP), where the network 130 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
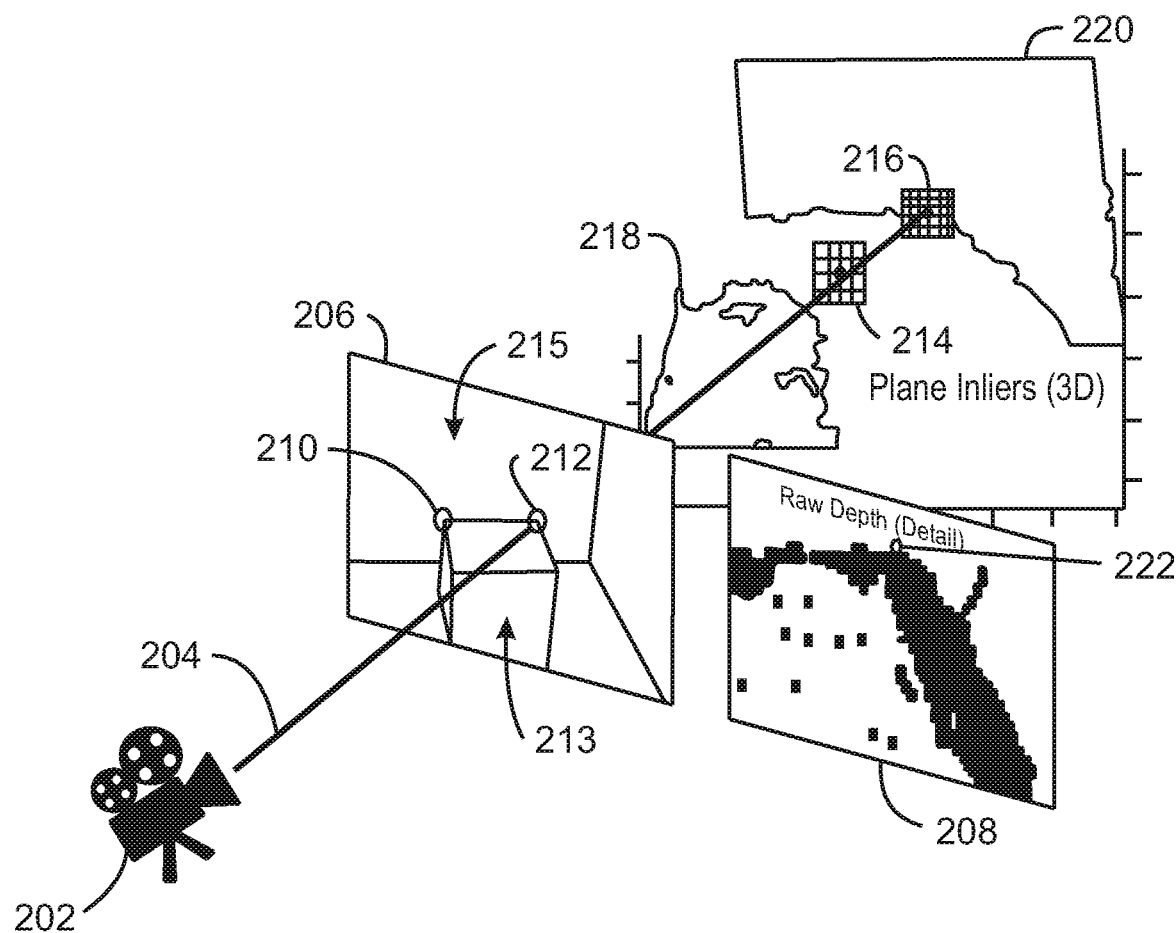
FIG. 2 is an illustration of a 3D point candidate estimation system including plane fitting and ray casting.

FIG. 2 is an illustration of a 3D point candidate estimation system 200 including plane fitting and ray casting. In FIG. 2, a camera 202 casts a ray 204 to the plurality of planes in a RGB image 206. In embodiments, a ray is cast into each point as selected by a user. The example of FIG. 2 describes two points as selected by a user for ease of description. However, any number of points may be used. In particular, the plane fitting and ray casting as described may be used to find the location of a point candidate in 3D space. In the case of multiple points, the points may be used to calculate a distance, an area, or a volume according to the techniques described herein.

The camera captures an RGB-D image that is a color image 206 with an aligned depth map 208. The RBG-D image can provide the distance to the camera for each pixel in the color image, when available. The present techniques provide real-world measurement from the RGBD image and two points selected by the user.

The underlying principle of the present techniques is that locally, a plane can be fitted to any region, due to local continuity in real world scenes. Once a point is selected in the RGB image, one or more planes may be defined by a plane fitting algorithm, in consideration of the pixels with a valid depth value close to the selected point in the depth image aligned to the color image. Specifically, Sequential RANSAC plane fitting produces a good estimation of multiple planes in presence of sensor noise. This plane fitting method simultaneously provides a segmentation of the image into different depth regions, sensor noise reduction and outlier removal, and an analytical model of the found planes in 3D, enabling extrapolation in case of missing data. This operation provides accurate results even in case of sparse depth data, a common case with low-cost depth cameras. As the user's intent is not always well defined from a click on the 2D image as discussed with respect to FIG. 1C, several solutions are proposed to the user as a result of the present techniques, corresponding to the different possible 3D locations of each point. Additionally, the combination of plane fitting and ray casting minimizes the impact of inaccuracy in point selection on an image, which is subjected to the input media (touchpad, mouse, etc.).

The depth information available around each selected point, as well as the depth information in the region in-between the two selected points, is used to represent the scene as a set of planes in 3D space. The spatial coordinates of the two selected measurement points are retrieved by casting rays from the camera through the pixels and computing their intersections with the different planes found. Several most probable distances are then proposed in consideration of the retrieved spatial coordinates of the 3D points.

Consider the scenario where a user has selected point 210 and point 212 along the top portion of the cube 213. In embodiments, plane fitting is performed in the 3D region corresponding to the neighborhood of each point selected in the 2D image, resulting in a plane 214 and 216. In some cases, a plurality of planes is found for each point. For example, a point in a corner may have three planes that correspond to each wall that meets at the corner. Ray casting may be performed, where a line or ray 204 is cast from the camera center point through the pixel in the image. The virtual ray 204 emanating from the camera 202 and to the selected pixel 212 intersects the plane 214 and the plane 216. The 3D coordinates are retrieved as the intersection between the ray/line and the plane(s).

The intersection between the cast ray 204 and the planes 214 and 216 found fit in 3D space provides candidates for the 3D location of the point 212 selected on the RGB image. The point 222 in the depth image 208 corresponds to point 212 in the RGB image 206. The inliers of the top plane 214 are illustrated at reference number 218. The inliers of the plane 216 as illustrated at reference number 220. As used herein, the inliers are points that are within a margin, while the outliers are points that are outside the margin. The margin may be a function of the depth contained in the region around each point on the 2D image.

Figure 3:
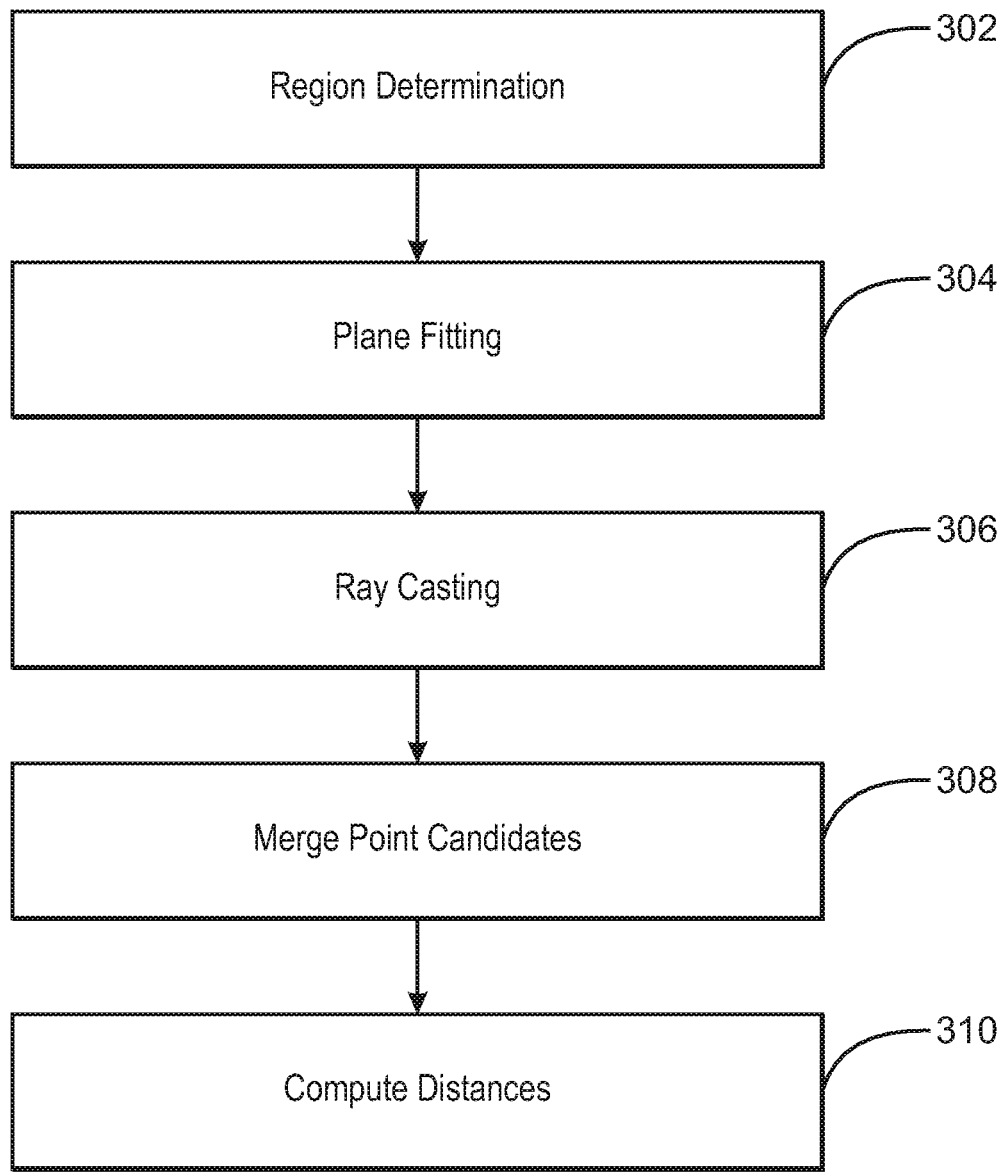
FIG. 3 is a process flow diagram of a method for real world measurement from a single image.

FIG. 3 is a process flow diagram of a method 300 for real world measurement from a single image. In embodiments, the present techniques combine plane fitting with the back-projection of the 2D points onto each of the planes for the accurate estimation and selection of the points in 3D space. In embodiments, back projection consists of ray casting until a known depth value.

At block 302, region determination is performed. The search for planes is performed in parallel on three different regions of the input image. These regions include a common region defined around the segment between both points and a neighborhood of each individual point whose size is set adaptively to ensure a minimal amount of valid depth data.

Figure 4A:
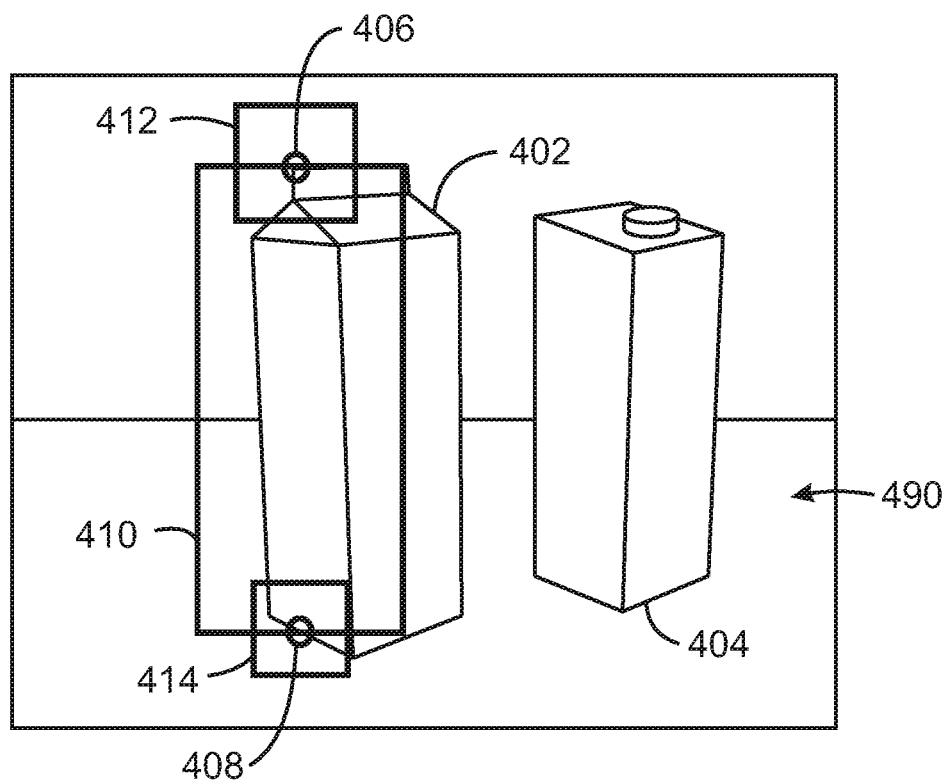
FIG. 4A is an illustration of region determination of a frame that includes a milk carton.

Consider an example of an image including a milk carton. FIG. 4A is an illustration of region determination of a frame 400A that includes a milk carton 402 and a drink carton 404.

A user has selected a point 406 and a point 408 to determine the height of the milk carton 402. In FIG. 4A, two individual points are illustrated. A common region 410 includes the area on the image connecting between point 406 and point 408. A second region 412 includes the point 406 and its neighborhood, and a third region 414 includes the point 408 and its neighborhood. The size of the neighborhood regions 412 and 414 may be set adaptively such than a minimal number of valid depth pixels are included in each region. While each region is illustrated as a rectangle or square, any shape of region may be used.

Referring now to FIG. 3, at block 304, plane fitting is performed. In plane fitting, the inlier threshold or margin is increased or decreased as a function of the average depth of the considered region, similar to the noise model of depth cameras. The inlier threshold is the maximal distance from the plane at which a point is considered an inlier point belonging to that particular plane. In embodiments, each plane detected in the common region is validated if a minimal number of inliers was found in the vicinity of at least one of the measurement points. In embodiments, Sequential RANSAC plane fitting (PF) may be used to avoid considering the depth values of the two input points, often unreliable due to sensor noise or alignment inaccuracy (e.g. point 222 in FIG. 2). Sequential RANSAC plane fitting provides an adequate estimation of multiple models in presence of outliers, i.e. the accurate detection of different planes from noisy depth data.

Figure 4B:
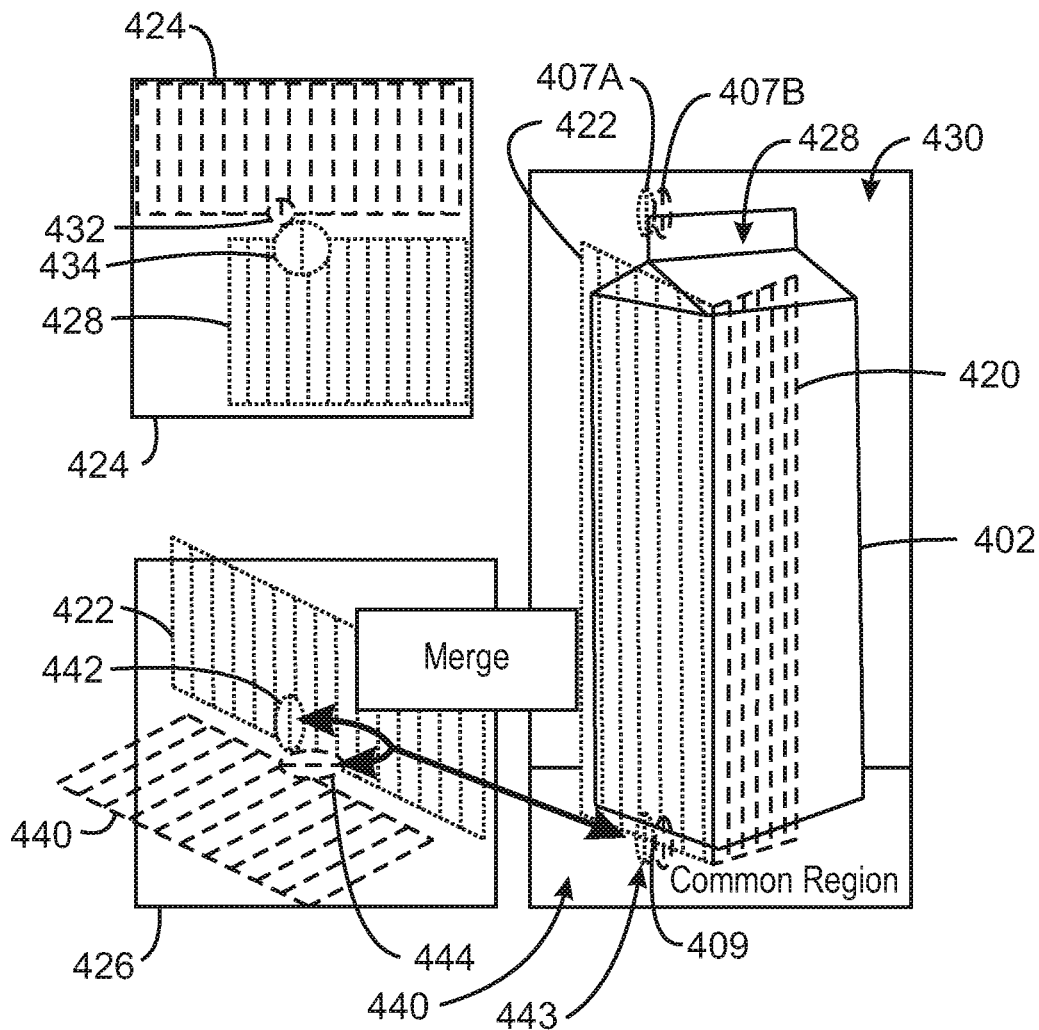
FIG. 4B is an illustration of merging point candidates.

At block 306, ray casting is performed. The ray-casting operation provides the 3D point candidates, given a plane candidate, a point in the image, and the camera parameters. At block 308, point candidates for each respective point are merged. In embodiments, the point candidates with similar 3D coordinates are merged. Merging the point candidates may include averaging the coordinates of each point candidate, keeping only the point closest to the camera or any similar heuristic based on the coordinates of both points. FIG. 4B is an illustration of merging point candidates. In FIG. 4B, a plane 420 and a plane 422 have been found in the common region after back-projection to 3D space. The 3D region 424 includes a point 407 that corresponds to the selected 2D point 406 in FIG. 4A. The neighborhood 412 is illustrated in FIG. 4B, along with the 3D region 426 for and point 409 that corresponds to the selected 2D point 408 and the neighborhood 414. Note that 406 in FIG. 4A is a point selected in 2D, while the reference number 407 in 4B includes two 3D candidates estimated for the 3D point. The point to the left at 407A is the result of plane fitting onto 422, and the point to the right at 407B is the result of plane fitting onto plane 420. The selected 2D point 406 has 3D candidates 432 and 434 in the neighborhood region 424, and point candidates 407A and 407B in the common region. Similarly, the selected point 2D 408 has 3D point candidates 442 and 444 in the neighborhood region 426, and point candidates 443 and 409 in the common region.

In the example of FIG. 4B, the neighborhood region 424 of the 2D image point 406 has two planes. A plane 428 corresponds to the upper vertical face of the carton 402, and a plane 430 corresponds to the background of the carton 402. This results in a point candidate for each plane. Similarly, the neighborhood region 426 of the 2D image point 408 has two planes. A plane 422 that corresponds to the front face of the carton 402 and a plane 440 that corresponds to the tabletop where the carton 402 sits. The two planes again result in a point candidate for each plane. However, the plane 422 occurs in both the common region 410 and the region 426. A third point candidate for point 408 lies in the common region. Merging for the point 408 is to include point candidates 442, 443, and 444. Note that the point candidate 409 is the result of plane fitting onto plane 420 and should not be merged when determining the location of 2D point 406, as it is not the same point in 3D. Similarly, that the point candidate 407B is the result of plane fitting onto plane 420 and should not be merged when determining the location of 2D point 408, as it is not the same point in 3D.

Accordingly, the point candidates, two types of merging can occur. First, points at the intersection of two or more planes are merged. Merging also occurs between the point candidates of the neighborhood regions and the common region. In embodiments, two candidate points may be found in each neighborhood region and can be merged with point candidates found in the common region.

Referring again to FIG. 3, at block 310, the distances between the final point candidates are computed. In the example, two possibilities were found for the upper point 406: either on the milk carton 402 or on the background surface behind 430 behind the carton 402. In embodiments, the type of distance may be specified to the user. For example, the type of distance may be specified as based on a common plane or based on independent regions. The most probable case may be determined and provided to a user as a first choice. For example, the milk carton's height is provided first (with an accuracy of 1 mm) as it is considered the most probable case.

The present techniques improve the accuracy of real-world measurement over hole-filling based techniques which can produce undesirable artifacts, and over temporal approaches which averages data over time. A single RGB-D image may be used, which does not require scanning the scene before measurement, in contrast with other temporal approaches. Moreover, the present techniques are area-based, and as a result are robust to sensor noise and outliers, and to the inaccuracy due to image alignment or to user point selection. Accurate results may be obtained, even with a small amount of depth data. The present techniques are very fast, and provide multiple solutions, instead of guessing which points the user intended from his point selection on the 2D image. In case of low confidence, no solution may be returned instead of a wrong solution. Further, the present techniques improve user experience by providing additional information on the results, and by proposing multiple solutions in case of ambiguity.

For example, a user interface according to the present techniques may display multiple measurements in the case of any ambiguity. A first measurement may indicate that the points lie on the same plane, while a second measurement can indicate points do not lie on the same plane. In embodiments, the information rendered for a user may also include oriented normals to offer the user a better perception of the point locations.

Figure 5:
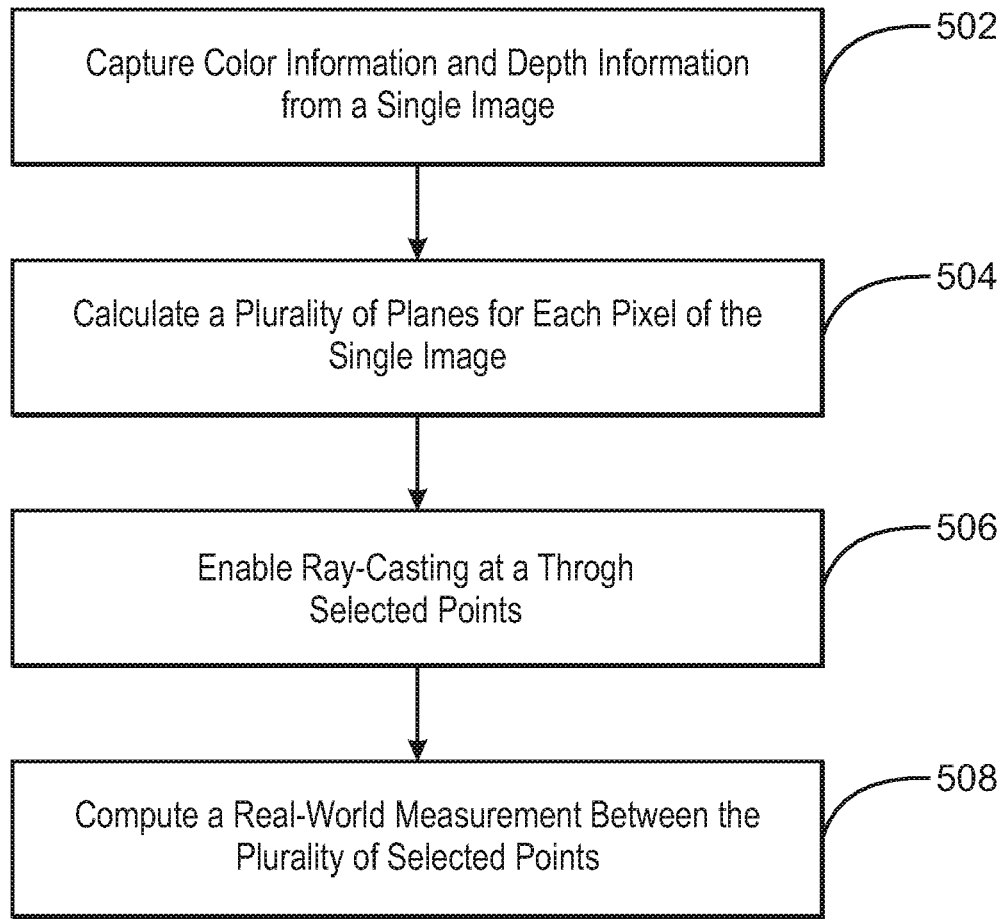
FIG. 5 is a process flow diagram of a method for electronic measurement via a single image.

FIG. 5 is a process flow diagram of a method 500 for estimation of 3D point candidates from a single image. At block 502, color information and depth information is captured in a single image. At block 504, a plurality of planes for each pixel of the single image is calculated. In embodiments, plane fitting is used to find the planes. Additionally, surface fitting may be used to estimate the analytical model of a surface on which lies the point of the single image. At block 506, ray casting through two selected points in the image is enabled. At block 508, a real-world measurement between the plurality of selected points is computed. The 3D point candidates can be estimated via plane fitting and ray casting. In embodiments, determining real world measurements is an application of the 3D point candidates found via plane fitting and ray casting. The present techniques are well adapted to non-planar surfaces as well, considering that almost any object is locally planar. Additionally, the inlier threshold increases with depth so that for instance one plane could fit a person at a certain distance from the camera.

This process flow diagram is not intended to indicate that the blocks of the example process 500 are to be included in every case. Further, any number of additional blocks not shown may be included within the example process 500, depending on the details of the specific implementation.

Figure 6:
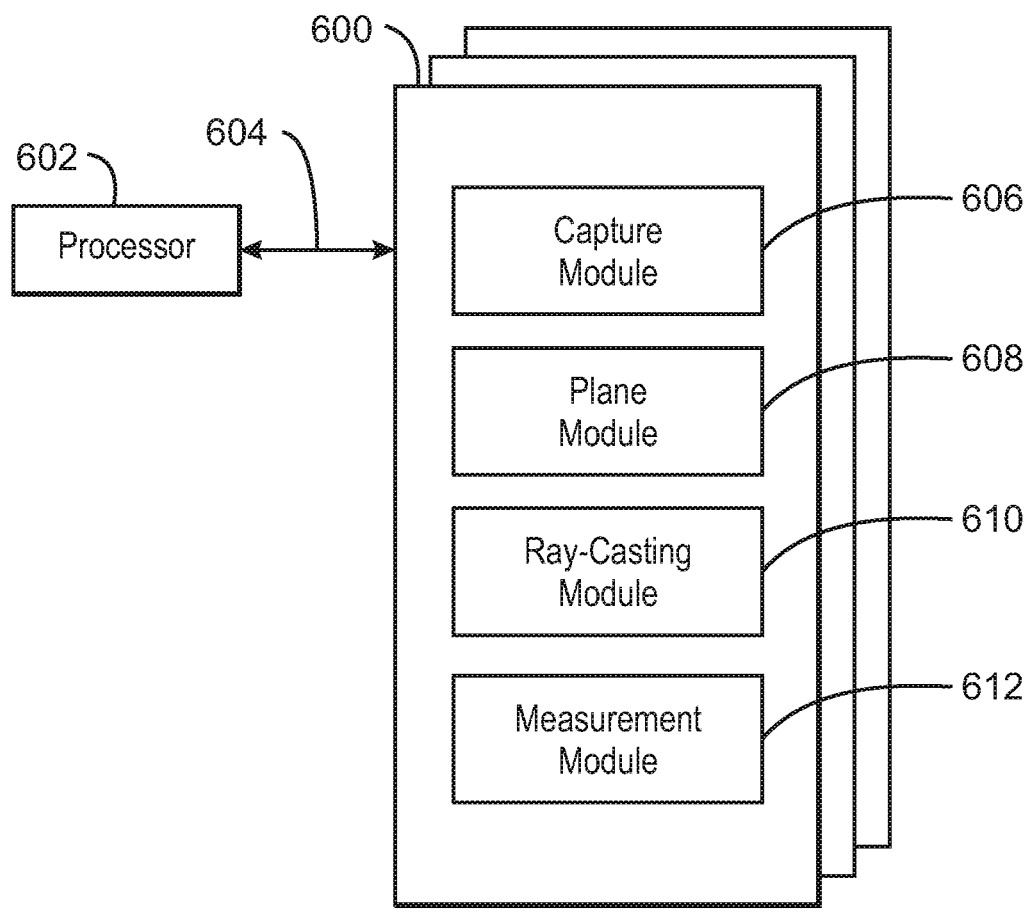
FIG. 6 is a block diagram showing a medium that contains logic for an electronic measurement via a single image.

FIG. 6 is a block diagram showing a medium 600 that contains logic for an electronic measurement via a single image. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-612 configured to perform the techniques described herein. For example, a capture module 606 may be configured to capture color information and depth information in a single image. A plane module 608 may be configured to calculate a plurality of planes for each pixel of the single image. A ray-casting module 610 may be configured to enable ray casting of the single image at a plurality of selected points. A measurement module 612 may be configured to compute a real-world measurement between two selected points. In some embodiments, the modules 606-610 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Example 1 is an apparatus for estimation of 3D point candidates from a single image. The apparatus includes a surface fitting mechanism that is to estimate the analytical model of a surface on which lies the point of the single image; a ray casting unit that is to cast a virtual ray at the selected point that intersects the surface; and a computing unit to compute a least one three-dimensional location for the selected point based on the intersection of the virtual ray and the plane.

Example 2 includes the apparatus of example 1, including or excluding optional features. In this example, the surface fitting mechanism is a plane fitting mechanism that is to calculate one or more planes for a selected point of the single image.

Example 3 includes the apparatus of any one of examples 1 to 2, including or excluding optional features. In this example, the surface is computed using the selected point and a plurality of points in a neighborhood of the selected point.

Example 4 includes the apparatus of any one of examples 1 to 3, including or excluding optional features. In this example, the surface fitting mechanism is to calculate the surface via Sequential RANSAC plane fitting.

Example 5 includes the apparatus of any one of examples 1 to 4, including or excluding optional features. In this example, no three dimensional location exists for the selected point.

Example 6 includes the apparatus of any one of examples 1 to 5, including or excluding optional features. In this example, the apparatus includes an image capture mechanism, wherein the image capture mechanism in an RGB-D camera.

Example 7 includes the apparatus of any one of examples 1 to 6, including or excluding optional features. In this example, the apparatus includes an image capture mechanism, wherein the image capture mechanism is a time of flight (ToF) camera, ranging camera, flash LIDAR, or any combination thereof.

Example 8 includes the apparatus of any one of examples 1 to 7, including or excluding optional features. In this example, the surface fitting mechanism is to calculate a plurality of planes for the selected point.

Example 9 includes the apparatus of any one of examples 1 to 8, including or excluding optional features. In this example, a three dimensional location for each point of a plurality of selected points is determined. Optionally, the three dimensional location for each point of the plurality of selected points is used to compute a real-world measurements between each point of the plurality of selected points.

Example 10 includes the apparatus of any one of examples 1 to 9, including or excluding optional features. In this example, the computing unit is to compute one or more three-dimensional locations and a user is to select a best real-world measurement.

Example 11 includes the apparatus of any one of examples 1 to 10, including or excluding optional features. In this example, the ray-casting unit determines multiple candidate points for the selected point. Optionally, the candidate points are merged for each selected point.

Example 12 includes the apparatus of any one of examples 1 to 11, including or excluding optional features. In this example, an image capture mechanism is to capture both color information and depth information in the single image for a scene.

Example 13 is a method for estimation of 3D point candidates from a single image. The method includes capturing color information and depth information in the single image; calculating a plurality of planes for selected points in the single image; enabling ray casting of the single image at the selected points to obtain three dimensional point candidates at each intersection between a plane of the plurality of planes and a virtual ray; and merging the three dimensional point candidates for each respective selected point to obtain a location estimate for each selected point.

Example 14 includes the method of example 13, including or excluding optional features. In this example, the selected points are used to determine a common region across all selected points and an individual region for each selected point, and the plurality of planes are based on the common region and the individual regions.

Example 15 includes the method of any one of examples 13 to 14, including or excluding optional features. In this example, the plurality of planes are discovered via plane fitting, where an inlier threshold of each plane is increased with the square of a depth descriptor of a considered region, wherein the depth descriptor is an average or percentile point.

Example 16 includes the method of any one of examples 13 to 15, including or excluding optional features. In this example, each plane of the plurality of planes is validated if a minimum number of inliers is found in the vicinity of the selected point.

Example 17 includes the method of any one of examples 13 to 16, including or excluding optional features. In this example, the location estimate for each selected point comprises multiple three dimensional locations.

Example 18 includes the method of any one of examples 13 to 17, including or excluding optional features. In this example, the color information and depth information is captured by an RGB-D camera.

Example 19 includes the method of any one of examples 13 to 18, including or excluding optional features. In this example, the color information and depth information is captured by a time of flight (ToF) camera, ranging camera, flash LIDAR, or any combination thereof.

Example 20 includes the method of any one of examples 13 to 19, including or excluding optional features. In this example, the plurality of planes is calculated using Sequential RANSAC plane fitting.

Example 21 includes the method of any one of examples 13 to 20, including or excluding optional features. In this example, the merged three dimensional point candidates for each respective selected point are used to calculate a real world measurement in three dimensional space. Optionally, the real world measurement comprises a point-to-point distance, an area, a volume, or any combination thereof.

Example 22 is a system. The system includes a display; an image capture mechanism to generate a single image; a memory that is to store instructions and that is communicatively coupled to the image capture mechanism and the display; and a processor communicatively coupled to the image capture mechanism, the display, and the memory, wherein when the processor is to execute the instructions, the processor is to: calculate a plurality of planes for selected points in the single image; enable ray casting of the single image at the selected points to obtain three dimensional point candidates at each intersection between a plane of the plurality of planes and a virtual ray; merge the three dimensional point candidates for each respective selected point to obtain a location estimate for each selected point.

Example 23 includes the system of example 22, including or excluding optional features. In this example, each plane of the plurality of planes is computed using a corresponding selected point and a plurality of points in a neighborhood of the selected point.

Example 24 includes the system of any one of examples 22 to 23, including or excluding optional features. In this example, the plurality of planes is calculated via Sequential RANSAC plane fitting.

Example 25 includes the system of any one of examples 22 to 24, including or excluding optional features. In this example, the image capture mechanism in an RGB-D camera.

Example 26 includes the system of any one of examples 22 to 25, including or excluding optional features. In this example, the image capture mechanism is a time of flight (ToF) camera, ranging camera, flash LIDAR, or any combination thereof.

Example 27 includes the system of any one of examples 22 to 26, including or excluding optional features. In this example, the three dimensional point candidates comprise a location for each point of the selected points.

Example 28 includes the system of any one of examples 22 to 27, including or excluding optional features. In this example, the three dimensional point candidates are used to compute a real-world measurement between the selected points. Optionally, the real world measurement is rendered on the display. Optionally, the real world measurement comprises a point-to-point distance, an area, a volume, or any combination thereof.

Example 29 is a tangible, non-transitory, computer-readable medium. The computer-readable medium includes instructions that direct the processor to capture color information and depth information in the single image; calculate a plurality of planes for selected points in the single image; enable ray casting of the single image at the selected points to obtain three dimensional point candidates at each intersection between a plane of the plurality of planes and a virtual ray; merge the three dimensional point candidates for each respective selected point to obtain a location estimate for each selected point.

Example 30 includes the computer-readable medium of example 29, including or excluding optional features. In this example, the selected points are used to determine a common region across all selected points and an individual region for each selected point, and the plurality of planes are based on the common region and the individual regions.

Example 31 includes the computer-readable medium of any one of examples 29 to 30, including or excluding optional features. In this example, the plurality of planes are discovered via plane fitting, where an inlier threshold of each plane is increased with the square of a depth descriptor of a considered region, wherein the depth descriptor is an average or percentile point.

Example 32 includes the computer-readable medium of any one of examples 29 to 31, including or excluding optional features. In this example, each plane of the plurality of planes is validated if a minimum number of inliers is found in the vicinity of the selected point.

Example 33 includes the computer-readable medium of any one of examples 29 to 32, including or excluding optional features. In this example, the location estimate for each selected point comprises multiple three dimensional locations.

Example 34 includes the computer-readable medium of any one of examples 29 to 33, including or excluding optional features. In this example, the color information and depth information is captured by an RGB-D camera.

Example 35 includes the computer-readable medium of any one of examples 29 to 34, including or excluding optional features. In this example, the color information and depth information is captured by a time of flight (ToF) camera, ranging camera, flash LIDAR, or any combination thereof.

Example 36 includes the computer-readable medium of any one of examples 29 to 35, including or excluding optional features. In this example, the plurality of planes is calculated using Sequential RANSAC plane fitting.

Example 37 includes the computer-readable medium of any one of examples 29 to 36, including or excluding optional features. In this example, the merged three dimensional point candidates for each respective selected point are used to calculate a real world measurement in three dimensional space. Optionally, the real world measurement comprises a point-to-point distance, an area, a volume, or any combination thereof.

Example 38 is an apparatus for estimation of 3D point candidates from a single image. The apparatus includes instructions that direct the processor to a means to fit an analytical model to estimate the analytical model of a surface on which lies the point of the single image; a ray casting unit that is to cast a virtual ray at the selected point that intersects the surface; and a computing unit to compute a three-dimensional location for the selected point based on the intersection of the virtual ray and the plane.

Example 39 includes the apparatus of example 38, including or excluding optional features. In this example, the means to fit the analytical model is a plane fitting mechanism that is to calculate one or more planes for a selected point of the single image.

Example 40 includes the apparatus of any one of examples 38 to 39, including or excluding optional features. In this example, the means to fit the analytical model is a surface fitting mechanism that is to calculate a model of any surface.

Example 41 includes the apparatus of any one of examples 38 to 40, including or excluding optional features. In this example, the surface is computed using the selected point and a plurality of points in a neighborhood of the selected point.

Example 42 includes the apparatus of any one of examples 38 to 41, including or excluding optional features. In this example, the plane fitting mechanism is to calculate the surface via Sequential RANSAC plane fitting.

Example 43 includes the apparatus of any one of examples 38 to 42, including or excluding optional features. In this example, no three dimensional location exists for the selected point.

Example 44 includes the apparatus of any one of examples 38 to 43, including or excluding optional features. In this example, the apparatus includes an image capture mechanism, wherein the image capture mechanism in an RGB-D camera.

Example 45 includes the apparatus of any one of examples 38 to 44, including or excluding optional features. In this example, the apparatus includes an wherein an image capture mechanism, wherein the image capture mechanism is a time of flight (ToF) camera, ranging camera, flash LIDAR, or any combination thereof.

Example 46 includes the apparatus of any one of examples 38 to 45, including or excluding optional features. In this example, the means to fit the analytical model is to calculate a plurality of planes for the selected point.

Example 47 includes the apparatus of any one of examples 38 to 46, including or excluding optional features. In this example, a three dimensional location for each point of a plurality of selected points is determined. Optionally, the three dimensional location for each point of the plurality of selected points is used to compute a real-world measurements between each point of the plurality of selected points.

Example 48 includes the apparatus of any one of examples 38 to 47, including or excluding optional features. In this example, the computing unit is to compute one or more three-dimensional locations and a user is to select a best real-world measurement.

Example 49 includes the apparatus of any one of examples 38 to 48, including or excluding optional features. In this example, the ray-casting unit determines multiple candidate points for the selected point. Optionally, the candidate points are merged for each selected point.

Example 50 includes the apparatus of any one of examples 38 to 49, including or excluding optional features. In this example, an image capture mechanism is to capture both color information and depth information in the single image for a scene.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for estimation of 3D point candidates from a single image, comprising:
    a surface fitting mechanism that is to estimate the analytical model of a surface on which lies a selected point of the single image, wherein the surface fitting mechanism is to perform plane fitting to calculate a plane for the selected point, wherein an inlier threshold of the plane is increased with the square of an average depth of the surface;
    a ray casting unit that is to cast a virtual ray at the selected point that intersects the plane; and
    a computing unit to compute a least one three-dimensional location for the selected point based on the intersection of the virtual ray and the plane.

2. The apparatus of claim 1, wherein the surface is computed using the selected point and a plurality of points in a neighborhood of the selected point.

3. The apparatus of claim 1, wherein the surface fitting mechanism is to calculate the surface via Sequential RANSAC plane fitting.

4. The apparatus of claim 1, wherein no three dimensional location exists for the selected point.

5. The apparatus of claim 1, comprising an image capture mechanism, wherein the image capture mechanism in an RGB-D camera.

6. The apparatus of claim 1, comprising an image capture mechanism, wherein the image capture mechanism is a time of flight (ToF) camera, ranging camera, flash LIDAR, or any combination thereof.

7. The apparatus of claim 1, wherein the surface fitting mechanism is to calculate a plurality of planes for the selected point.

8. The apparatus of claim 1, wherein a three dimensional location for each point of a plurality of selected points is determined, and wherein the three dimensional location for each point of the plurality of selected points is used to compute real-world measurements between each point of the plurality of selected points.

9. The apparatus of claim 1, wherein the computing unit is to compute one or more three-dimensional locations and a user is to select a best real-world measurement.

10. The apparatus of claim 1, wherein the ray-casting unit determines multiple candidate points for the selected point.

11. A method for estimation of 3D point candidates from a single image, comprising:
    capturing color information and depth information in the single image;
    calculating a plurality of planes for selected points in the single image, wherein the plurality of planes are discovered via plane fitting, wherein an inlier threshold of each respective plane of the plurality of planes is increased with the square of an average depth of each respective plane;
    enabling ray casting of the single image at the selected points to obtain three dimensional point candidates at each intersection between a plane of the plurality of planes and a virtual ray; and merging the three dimensional point candidates for each respective selected point to obtain a location estimate for each selected point.

12. The method of claim 11, wherein the selected points are used to determine a common region across all selected points and an individual region for each selected point, and the plurality of planes are based on the common region and the individual regions.

13. The method of claim 11, wherein each plane of the plurality of planes is validated if a minimum number of inliers is found in a vicinity of the selected point.

14. The method of claim 11, wherein the location estimate for each selected point comprises multiple three dimensional locations.

15. A system, comprising:
a display;
an image capture mechanism to generate a single image;
a memory that is to store instructions and that is communicatively coupled to the image capture mechanism and the display; and
a processor communicatively coupled to the image capture mechanism, the display, and the memory, wherein when the processor is to execute the instructions, the processor is to:
calculate a plurality of planes for selected points in the single image, wherein the plurality of planes are discovered via plane fitting, wherein an inlier threshold of each respective plane of the plurality of planes is increased with the square of an average depth of each respective plane;
enable ray casting of the single image at the selected points to obtain three dimensional point candidates at each intersection between a plane of the plurality of planes and a virtual ray; and
merge the three dimensional point candidates for each respective selected point to obtain a location estimate for each selected point.

16. The system of claim 15, wherein each plane of the plurality of planes is computed using a corresponding selected point and a plurality of points in a neighborhood of the selected point.

17. The system of claim 15, wherein the plurality of planes is calculated via Sequential RANSAC plane fitting.

18. The system of claim 15, wherein the image capture mechanism in an RGB-D camera.

19. The system of claim 15, wherein the three dimensional point candidates comprise a location for each point of the selected points.

20. The system of claim 15, wherein the three dimensional point candidates are used to compute a real-world measurement between the selected points.

21. A tangible, non-transitory, computer-readable medium comprising instructions that, when executed by a processor, direct the processor to:
capture color information and depth information in a single image;
calculate a plurality of planes for selected points in the single image, wherein the plurality of planes are discovered via plane fitting, wherein an inlier threshold of each respective plane of the plurality of planes is increased with the square of an average depth of each respective plane;
enable ray casting of the single image at the selected points to obtain three dimensional point candidates at each intersection between a plane of the plurality of planes and a virtual ray; and
merge the three dimensional point candidates for each respective selected point to obtain a location estimate for each selected point.

22. The computer readable medium of claim 21, wherein the plurality of planes is calculated using Sequential RANSAC plane fitting.

23. The computer readable medium of claim 21, wherein the merged three dimensional point candidates for each respective selected point are used to calculate a real world measurement in three dimensional space, and the real world measurement comprises a point-to-point distance, an area, a volume, or any combination thereof.

* * * * *